(12) United States Patent
Zhu et al.

(10) Patent No.: US 8,159,773 B2
(45) Date of Patent: Apr. 17, 2012

(54) METHOD AND APPARATUS FOR FORMING SERVO PATTERNS ON A MAGNETIC-RECORDING DISK

(75) Inventors: Xuchu Zhu, Kanagawa (JP); Makoto Takase, Kanagawa (JP); Tomoo Ozaki, Kanagawa (JP); Wee Hei, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 0 days.

(21) Appl. No.: 12/504,530

(22) Filed: Jul. 16, 2009

(65) Prior Publication Data

US 2011/0069409 A1    Mar. 24, 2011

(30) Foreign Application Priority Data

Jul. 16, 2008    (JP) .................... 2008-184573

(51) Int. Cl.
*G11B 5/02*    (2006.01)
(52) U.S. Cl. ........................................ 360/75
(58) Field of Classification Search .............. None
See application file for complete search history.

(56) References Cited

U.S. PATENT DOCUMENTS

| 5,553,086 | A  | * | 9/1996 | Sompel et al. ............... 360/75 |
| 6,760,172 | B1 | * | 7/2004 | Hamaguchi et al. .......... 360/48 |
| 7,019,933 | B2 |   | 3/2006 | Iseri et al. |
| 7,106,545 | B2 |   | 9/2006 | Yatsu |
| 7,342,735 | B2 | * | 3/2008 | Hashimoto et al. ........... 360/75 |
| 7,486,467 | B2 | * | 2/2009 | Sai et al. ..................... 360/75 |

FOREIGN PATENT DOCUMENTS

| JP | 2003194060 | 7/2003 |
| JP | 2006266367 | 10/2006 |
| JP | 2007211956 | 8/2007 |

* cited by examiner

*Primary Examiner* — Will J Klimowicz
*Assistant Examiner* — James L Habermehl

(57) ABSTRACT

A method for forming servo patterns on a magnetic-recording disk. The method includes moving a magnetic-recording head in an opposite direction to a pattern development direction, when there is a faulty servo pattern. The method also includes positioning a write element of the magnetic-recording head on a track of the faulty servo pattern and forming a reserve servo pattern at a different circumferential location from that of the faulty servo pattern. The method includes moving the magnetic-recording head in the pattern development direction. The method further includes positioning the read element on the track of the faulty servo pattern and forming a new servo pattern in the pattern development direction at the circumferential location of the faulty servo pattern on a track disposed between the track of the faulty servo pattern and an outside diameter of the magnetic-recording disk, based on data read from the reserve servo pattern.

7 Claims, 9 Drawing Sheets

METHOD AND APPARATUS FOR FORMING SERVO PATTERNS ON A MAGNETIC-RECORDING DISK

CROSS-REFERENCE TO RELATED APPLICATION

This application claims priority from the Japanese Patent Application No. 2008-184573, filed Jul. 16, 2008, the disclosure of which is incorporated herein in its entirety by reference.

TECHNICAL FIELD

Embodiments of the present invention relate to a method and apparatus for forming servo patterns on a magnetic-recording disk.

BACKGROUND

On a magnetic-recording disk which is used in a disk drive, servo patterns are formed at given circumferential locations. These servo patterns represent data for indicating the approach of a track and data for indicating the deviation of a magnetic-recording head relative to a track where the servo pattern was formed. One method for forming these servo patterns, known by the term of art "self-servo writing," forms servo patterns on a magnetic-recording disk, utilizing a positioning mechanism of a magnetic-recording head provided by the disk drive, itself.

The self-servo writing method takes advantage of the fact that a write element and a read element in the magnetic-recording head are disposed, such that each is separated from the other along a radial direction of the magnetic-recording disk. The self-servo writing method sequentially forms servo patterns at given circumferential locations on the magnetic-recording disk by repeating a process that includes reading data from a previously formed servo pattern read by the read element of the magnetic-recording head to position the magnetic-recording head for forming a new servo pattern with the write element of the magnetic-recording head.

However, under circumstances such that there is a faulty servo pattern from which data cannot be read, for example, because the servo pattern was formed on a defect of the magnetic-recording disk, positioning of the magnetic-recording head would fail so that forming servo patterns at given circumferential locations on the magnetic-recording disk is hindered.

SUMMARY

Embodiments of the present invention include a method for forming servo patterns on a magnetic-recording disk. The method includes moving a magnetic-recording head in an opposite direction to a pattern development direction, when there is a faulty servo pattern from which data cannot be read by a read element of the magnetic-recording head. The method also includes positioning a write element of the magnetic recording head on a track where the faulty servo pattern was formed and forming a reserve servo pattern at a different circumferential location from a circumferential location of the faulty servo pattern. In addition, the method includes moving the magnetic-recording head in the pattern development direction. Moreover, the method includes positioning the read element on the track where the faulty servo pattern was formed and forming a new servo pattern in the pattern development direction by the write element at the circumferential location of the faulty servo pattern on a track disposed between the track where the faulty servo pattern was formed and an outside diameter of the magnetic-recording disk, based on data read from the reserve servo pattern by the read element.

DESCRIPTION OF THE DRAWINGS

The accompanying drawings, which are incorporated in and form a part of this specification, illustrate embodiments of the invention and, together with the description, serve to explain the embodiments of the present invention.

Figure 1:
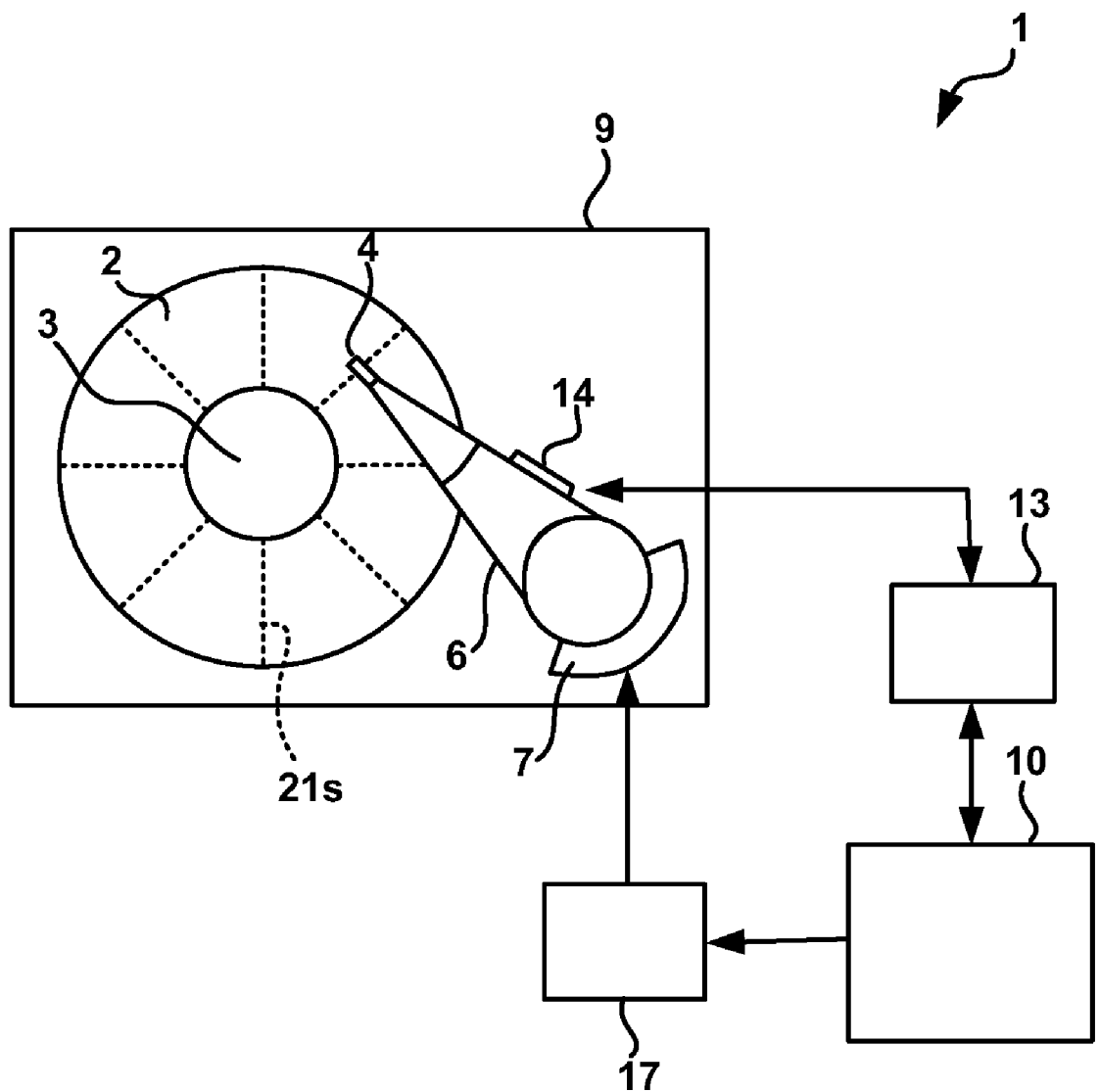
FIG. 1 is a example block diagram depicting a structure of an apparatus for forming servo patterns on a magnetic-recording disk, in accordance with an embodiment of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention.

Description of Embodiments of the Present Invention for a Method and Apparatus for Forming Servo Patterns on a Magnetic-Recording Disk Embodiments of the present invention provide a method and apparatus for forming servo patterns on a magnetic-recording disk, enabling servo patterns to be formed at given circumferential locations on a magnetic-recording disk, even if there is a faulty servo pattern from which data cannot be read at the given circumferential location. In accordance with embodiments of the present invention, the method for forming servo patterns on a magnetic-recording disk is such that servo patterns are formed by a magnetic-recording head at given circumferential locations on the magnetic-recording disk; the servo patterns at least represent data for indicating the approach of each given circumferential location and are configured to provide data for indicating the deviation of the magnetic-recording head relative to each of tracks where a servo pattern was formed. The magnetic-recording head includes a write element configured to form the servo patterns and a read element which is disposed at a radial distance from the write element in a direction opposite to a pattern development direction in which the servo patterns are developed radially on the magnetic-recording disk; and, the read element is configured to read data from each servo pattern formed by the write element, wherein the data read from each servo pattern is used to control timing to form a servo pattern and to control the position of the magnetic-recording head when forming the servo patterns. The method includes the following operations: moving the magnetic-recording head in the opposite direction to the pattern development direction, when there is a faulty servo pattern from which data cannot be read by the read element; positioning the write element on each of tracks where the faulty servo pattern was formed and forming a reserve servo pattern at a different circumferential location from the location of the faulty servo pattern; moving the magnetic-recording head in the pattern development direction; and positioning the read element on each of the tracks where the faulty servo pattern was formed and forming a new servo pattern at the given circumferential location of the faulty servo pattern by the write element in the pattern development direction on tracks disposed between the tracks where the faulty servo pattern was formed and an outside diameter of said magnetic-recording disk, based on data read from the reserve servo pattern by the read element.

Furthermore, in accordance with embodiments of the present invention, an apparatus for forming servo patterns on the magnetic-recording disk is such that the servo patterns are formed by a magnetic-recording head at given circumferential locations on the magnetic-recording disk and the servo patterns at least represent data for indicating the approach of each given circumferential location and are configured to provide data for indicating the deviation of the magnetic-recording head relative to each of tracks where a servo pattern was formed. The magnetic-recording head includes a write element to form the servo patterns and a read element which is disposed at a radial distance from the write element in the direction opposite to the pattern development direction in which the servo patterns are developed radially on the magnetic-recording disk; and, the read element is configured to read data from each servo pattern formed by the write element. The apparatus include's a control circuit that is configured to control timing to form a servo pattern and is configured to control the position of the magnetic-recording head when forming the servo patterns, based on data read from each servo pattern by the read element. The control circuit performs the following operations: moving the magnetic-recording head in the opposite direction to the pattern development direction, when there is a faulty servo pattern from which data cannot be read by the read element; positioning the write element on each of tracks where the faulty servo pattern was formed and forming a reserve servo pattern at a different circumferential location from the circumferential location of the faulty servo pattern; moving the magnetic-recording head in the pattern development direction; and positioning the read element on each of the tracks where the faulty servo pattern was formed and forming a new servo pattern in the pattern development direction by the write element at the given circumferential location of the faulty servo pattern on a track disposed between the tracks where the faulty servo pattern was formed and an outside diameter of said magnetic-recording disk, based on data read from the reserve servo pattern by the read element.

Furthermore, in an embodiment of the present invention, the method further includes moving the magnetic-recording head in the pattern development direction, when the faulty servo pattern exists, and checking in the pattern development direction whether there is another faulty servo pattern on tracks disposed between the tracks where the faulty servo pattern was formed and the outside diameter of the magnetic-recording disk; and, then, moving the magnetic-recording head in the opposite direction to the pattern development direction.

In an embodiment of the present invention, each servo pattern includes a plurality of types of burst patterns representing data for indicating the deviation of the magnetic-recording head, arranged at different positions from each other in the radial direction of the magnetic-recording disk. In an embodiment of the present invention, the method further includes, when there is a faulty burst pattern from which data cannot be read by the magnetic-recording head, forming at a different circumferential location a set of a plurality of types of reserve burst patterns corresponding to a set of the plurality of types of burst patterns including the faulty burst pattern.

In one embodiment of the present invention, a reserve servo pattern is formed so as to be distinguishable from other servo patterns. In another embodiment of the present invention, each servo pattern further represents data identifying a radial position on the magnetic-recording disk and a circumferential position on the magnetic-recording disk, and the method further includes storing radial and circumferential positions on the magnetic-recording disk where the faulty servo pattern exists. In an embodiment of the present invention, in a process of inspecting the servo patterns, the inspecting may skip the radial and circumferential positions on the magnetic-recording disk where the faulty servo pattern exists. In another embodiment of the present invention, the radial and circumferential positions on the magnetic-recording disk where the faulty servo pattern exists may be identified to the disk drive as a location not to be used for writing and reading data.

In another embodiment of the present invention, a magnetic-recording disk which is produced by the above method, includes servo patterns, which are formed at given circumferential locations, such that the servo patterns at least represent data for indicating the approach of each given circumferential location and are configured to provide data for indicating the deviation of the magnetic-recording head relative to each of tracks where a servo pattern was formed; and the magnetic-recording disk also includes a reserve servo pattern formed on the same tracks in which a faulty servo pattern from which data cannot be read has been detected among the servo patterns and in a different circumferential location from the circumferential location of the faulty servo pattern. Thus, for embodiments of the present invention, even if a faulty servo pattern exists, a reserve servo pattern is formed at a different circumferential location from the location of the faulty servo pattern and, by making use of this reserve servo pattern, the method provides for forming servo patterns at given circumferential locations.

With reference now to FIG. 1, in accordance with an embodiment of the present invention, a block diagram is shown that depicts an example of a structure of an apparatus for forming servo patterns on a magnetic-recording disk. The structure provides a servo pattern forming apparatus. The servo pattern forming apparatus is constructed as a disk drive 1. In a housing 9 of the disk drive 1, a magnetic-recording disk 2 and a head assembly 6 are contained. The magnetic-recording disk 2 is mounted on a spindle motor 3 provided in the bottom of the housing 9. There are servo data regions 21s at given circumferential locations on the recording surface of the magnetic-recording disk 2. The servo data regions 21s are arranged at certain intervals and a servo pattern representing a servo mark, address data, burst signals, etc. is formed in each servo data region 21s by a method which will be described later. The head assembly 6 is pivotally supported over a side of the magnetic-recording disk 2. A magnetic-recording head 4 is supported at a distal end of the head assembly 6. At the end opposite to the distal end of the head assembly 6, a voice coil motor 7 is provided. The voice coil motor 7 moves the magnetic-recording head 4 in a substantially radial direction on the magnetic-recording disk 2 by driving the head assembly 6 to turn about a pivot. The disk drive 1 also includes a control circuit 10, a channel circuit 13, and a driver circuit 17 on a integrated circuit chip outside the housing 9. The control circuit 10 includes a micro processing unit (MPU), a hard disk controller (HDC), and data storage means such as a memory.

With further referenced to FIG. 1, in accordance with an embodiment of the present invention, the control circuit 10 generates data for forming servo patterns on the magnetic-recording disk 2 and outputs that data to an amplifier circuit 14 via the channel circuit 13. The amplifier circuit 14 converts this data into a recording signal which is in turn output to the magnetic-recording head 4. The magnetic-recording head 4 converts the recoding signal into a magnetic-recording field which is in turn applied to the magnetic-recording disk 2 to form a servo pattern on the magnetic-recording disk 2. On the other hand, the magnetic-recording head 4 converts a magnetic field of the fringing magnetic flux of a servo pattern formed on the magnetic-recording disk 2 into a read-back signal which is in turn output to the amplifier circuit 14. The amplifier circuit 14 amplifies the read-back signal which is in turn output to the channel circuit 13. The channel circuit 13 extracts data from the read-back signal in sampling periods corresponding to the intervals between adjacent servo data regions 21s and outputs the data to the control circuit 10. The control circuit 10 is configured to control positioning of the magnetic-recording head 4, based on the data input from the channel circuit 13. In particular, the control circuit 10 is configured to calculate the deviation of the magnetic-recording head 4 relative to a target track from a burst signal included in the data input from the channel circuit 13, is configured to generate a control signal to offset the deviation, and is configured to output the control signal to the voice coil motor 7 via the driver circuit 17. In an embodiment of the present invention, when servo patterns are formed on the magnetic-recording disk 2, the magnetic-recording head 4 and voice coil motor 7 inside the housing 9 are controlled by the control circuit 10, channel circuit 13, and driver circuit 17 provided in the disk drive 1. The preceding description is by way of example and not limitation thereto, as a magnetic-recording head 4 and voice coil motor 7 inside the housing 9, which are controlled by an external device, are also within the spirit and scope of embodiments of the present invention.

Figure 2:
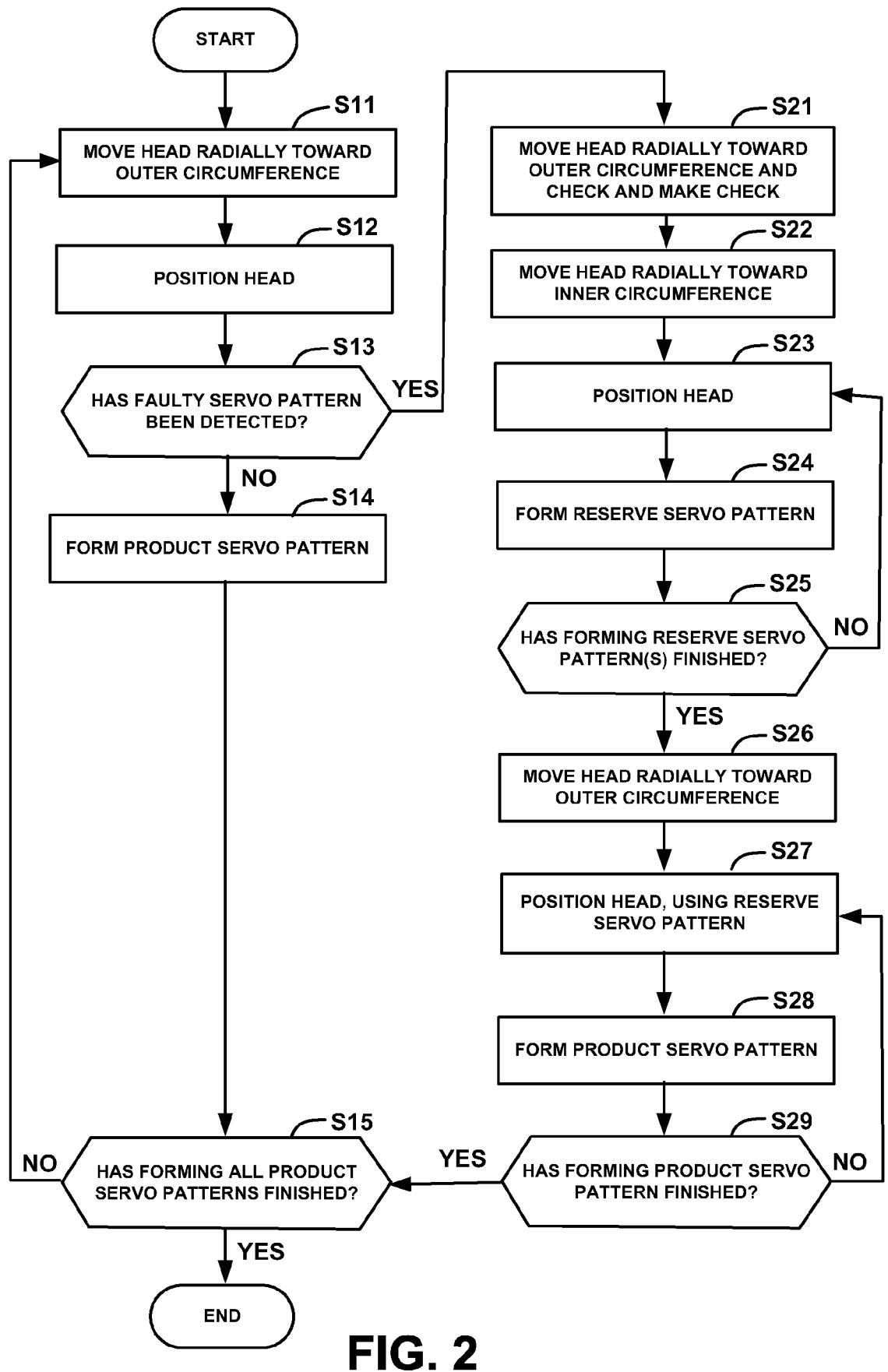
FIG. 2 is an example flowchart illustrating a method for forming servo patterns on a magnetic-recording disk, according to an embodiment of the present invention.
Figure 3:
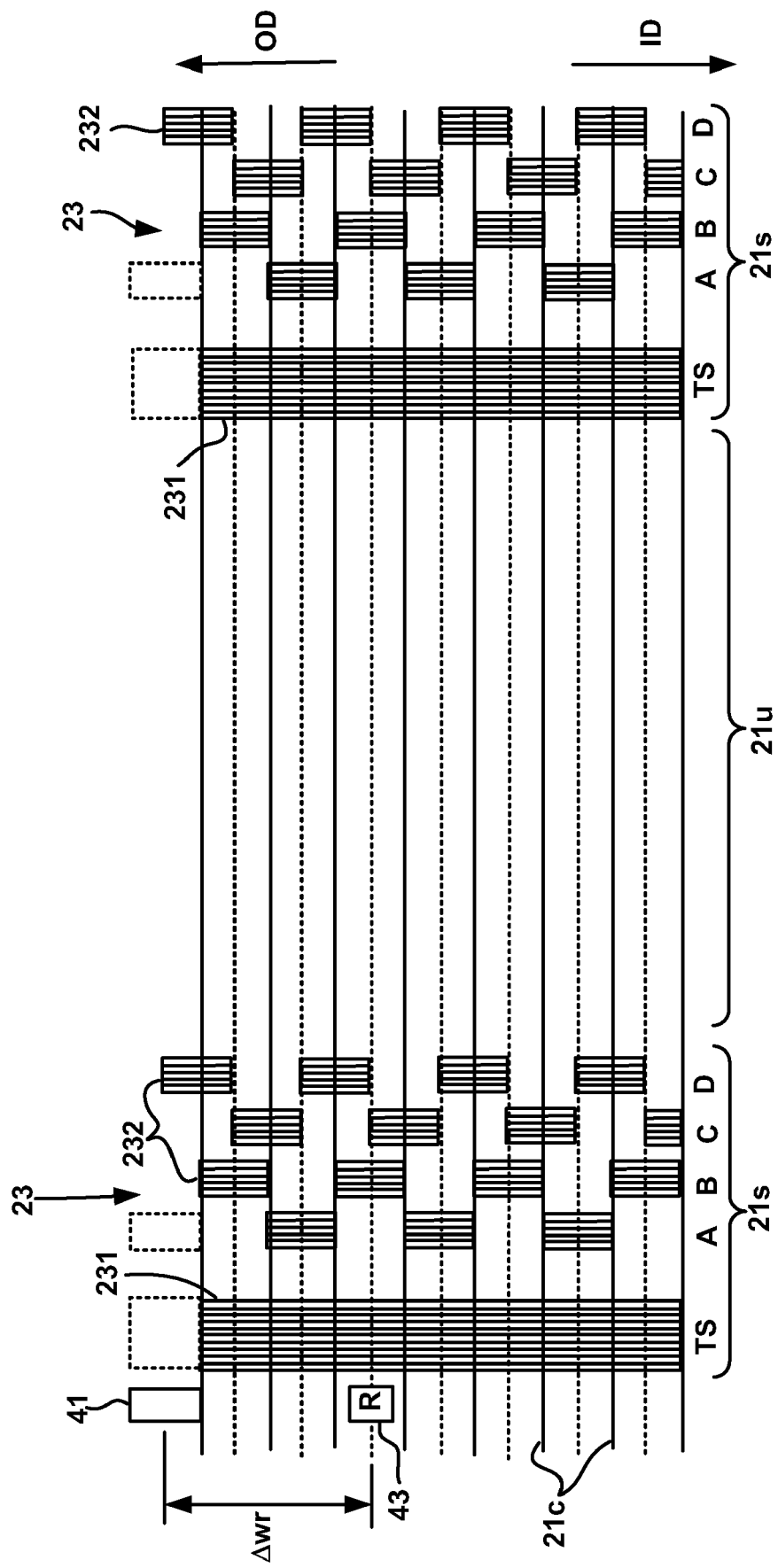
FIG. 3 is an explanatory diagram for operations S11 through S15 of the flowchart of FIG. 2, according to an embodiment of the present invention.

With reference now to FIG. 2, in accordance with an embodiment of the present invention, a flowchart illustrating a method for forming servo patterns on a magnetic-recording disk is shown. This method is implemented in the above disk drive 1. With reference also to FIG. 3, in accordance with an embodiment of the present invention, an explanatory diagram for operations S11 through S15 of the flowchart of FIG. 2 is shown. FIG. 3 is an enlarged view of the magnetic-recording disk 2 which shows an example structure of servo patterns when servo patterns are formed. In FIG. 3, for explanatory purposes, the circumferential direction of the magnetic-recording disk 2 is represented along lines and a relatively shorter user data region 21u is shown. As can be seen in FIG. 3, in servo data regions 21s on the magnetic-recording disk 2, product servo patterns 23 are sequentially formed, by the write element 41 of the magnetic-recording head 4, track by track in progressing toward the outer circumference, which is associated with the outside diameter (OD), of the magnetic-recording disk 2. As used herein, the term of art "pattern development direction" refers to the direction in which the write element 41 of the magnetic recording head proceeds towards the outer circumference of the magnetic-recording disk 2 in the development of the product servo patterns 23. Therefore, the pattern development direction lies substantially along the radial direction of the magnetic-recording disk 2 and is directed towards the outer circumference of the magnetic-recording disk 2.

With further reference to FIG. 3, in accordance with an embodiment of the present invention, the product servo patterns 23 are formed in the servo data regions 21s; the product servo patterns 23 are used when reading data from and writing data to magnetic-recording disk 2 of the disk drive 1. Each of these product servo patterns 23 includes a product address pattern 231 formed at the beginning of a servo data region 21s and four types of product burst patterns 232 that are further designated A, B, C and D, for example, 232A, 232B, 232C and 232D, respectively, which are formed at different radial positions on the magnetic-recording disk 2. Tracks arranged concentrically on the magnetic-recording disk 2 are defined by the product burst patterns 232, respectively. In particular, the product burst patterns 232A, 232B define tracks to be centered for reading and writing data (data center 21C) to magnetic-recording disk 2 of the disk drive 1; and, the product burst patterns 232C, 232D define intermediate tracks therebetween.

With further reference to FIG. 3, in accordance with an embodiment of the present invention, the product address pattern 231 represents address data to identify an absolute position within the recording surface of the magnetic-recording disk 2. The address data includes cylinder data to identify a radial position within the recording surface of the magnetic-recording disk 2 by a serial number assigned to each data center 21c and sector data to identify a circumferential position within the recording surface of the magnetic-recording disk 2 by a serial number assigned to each servo data region 21s. At the beginning of the product address pattern 231, a servo mark is formed to indicate the approach of a servo data region 21s. When the servo mark is read from the product address pattern 231 by a read element included in the magnetic-recording head 4, the above-described control circuit 10 may be signaled of the up-coming approach of the servo data region 21s under the magnetic-recording head 4, based upon which, the control circuit 10, in turn, may predict timing at which an arbitrary circumferential position is to arrive.

With further reference to FIG. 3, in accordance with an embodiment of the present invention, the product burst patterns 232 represent burst signals to indicate the deviation of the magnetic-recording head 4, which determines relative position of the magnetic-recording head 4, relative to each of the tracks defined by the product burst patterns 232. When the burst signals are read from product burst patterns 232 by the read element 43 included in the magnetic-recording head 4, the above-described control circuit 10 may possess information with respect to the deviation of the magnetic-recording head 4 relative to each of the tracks defined by these patterns. In the magnetic-recording head 4, the read element 43 is disposed nearer to the inner circumference, which is associated with the inside diameter (ID), of the magnetic-recording disk 2 than the write element 41. FIG. 3 shows an example situation where the distance $\Delta$wr between the write element 41 and the read element 43 along the radial direction of the magnetic-recording disk 2 is equivalent to six tracks. Thus, when product servo patterns 23 are developed by the write element 41 of the magnetic-recording head 4 in progressing towards the outer circumference, the read element 43 may read data from a previously formed portion of the product servo patterns 23.

Thus, with reference once again to the flowchart of FIG. 2, in accordance with an embodiment of the present invention, the control circuit 10 moves the magnetic-recording head 4 radially toward the outer circumference, at operation S11, to position the write element 41 in a radial position where a new product servo pattern 23 should be formed. The control circuit 10 positions the magnetic-recording head 4, at operation S12, based on data read by the read element 43 from a previously formed product servo pattern 23. In particular, according to a burst signal read from a product burst pattern 232 on a track on which the read element 43 is currently positioned, the control circuit 10 determines the deviation of the read element 43 relative to this track and drives the voice coil motor 7 to offset this deviation. After the magnetic-recording head 4 has been positioned, the control circuit 10 controls the timing to form a new product servo pattern 23 by the write element 41, at operation S14, based on data read from the previously formed product servo pattern 23 by the read element 43. In particular, the control circuit 10 causes the write element 41 to form a new product servo pattern 23 in synchronization with the timing of the approach of a servo data region 21s under the magnetic-recording head 4, which may be determined from a servo mark read from the product address pattern 231 on the track on which the read element 43 is currently positioned. Forming a new product servo pattern 23 is performed for the next approaching servo data region 21s to the servo data region 21s from which the servo mark has been read. By repeating these operations S11 through S14, the control circuit 10 forms all product servo patterns 23 in servo data regions 21s on the magnetic-recording disk 2, at operation S15. However, during the process of forming product servo patterns 23 in servo data region 21s as described above, a faulty servo pattern may be formed, for example, because a product servo pattern 23 may have been formed over a defect in the magnetic-recording disk 2. Forming product servo patterns 23 when a faulty servo pattern has been detected is next described.

Figure 4A:
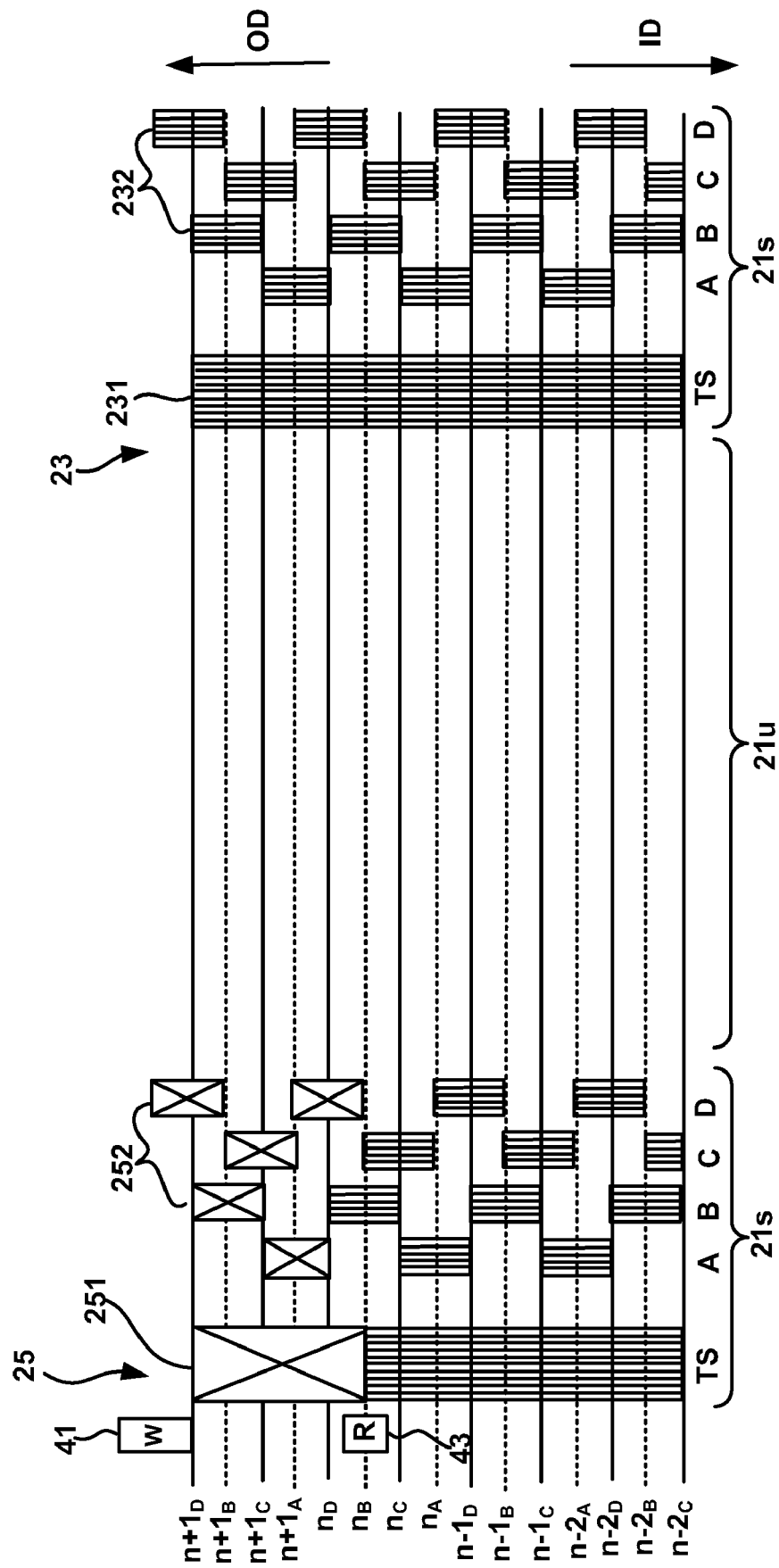
FIG. 4A is an explanatory diagram for operation S13 of the flowchart of FIG. 2, according to an embodiment of the present invention.

With reference now to FIG. 4A, in accordance with an embodiment of the present invention, an example situation is shown where a product servo pattern 23 formed over tracks $n_D$ to $n+1_D$ in a part of servo data regions 21s is a faulty servo pattern 25, for example, a faulty address pattern 251 and faulty burst patterns 252. In this case, the control circuit 10 detects the faulty servo pattern 25 when the read element 43 is positioned on a track $n_B$. Thus, in an embodiment of the present invention, the faulty servo pattern 25 is a servo pattern from which data cannot be read by the read element 43 and, more specifically, a servo pattern in which original data cannot be restored from a read-back signal converted by the read element 43, among product servo patterns 23 formed in the servo data regions 21s.

Figure 4B:
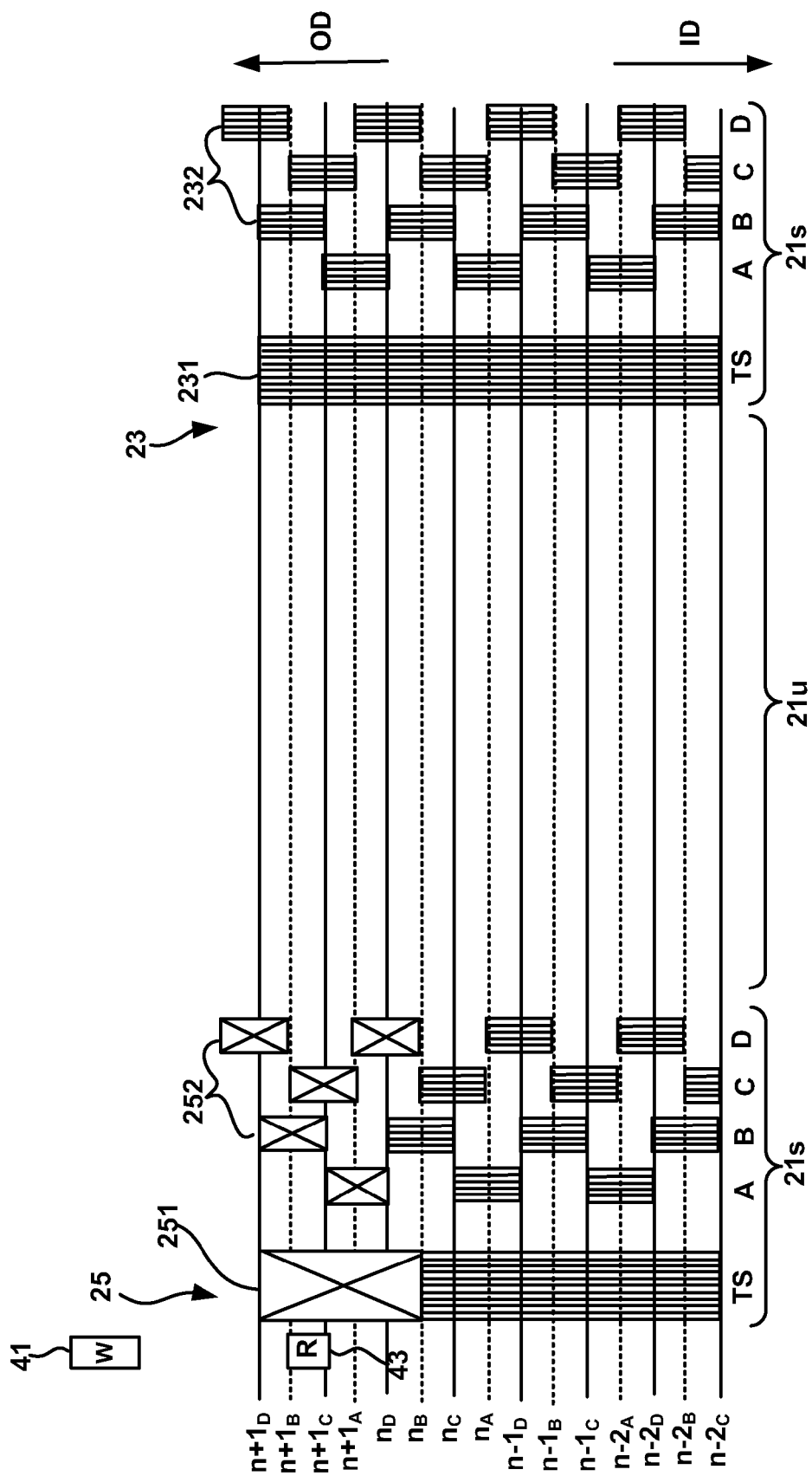
FIG. 4B is an explanatory diagram for operation S21 of the flowchart of FIG. 2, according to an embodiment of the present invention.

With reference now to FIG. 4B, in accordance with an embodiment of the present invention, when a faulty servo pattern 25 is detected, for example, on the YES branch after operation S13, the control circuit 10 moves the magnetic-recording head 4 radially toward the outer circumference, and checks whether another faulty servo pattern 25 exists over tracks $n+1_A$ to $n+1_D$ which are nearer to the outer circumference than the track $n_D$ on which the faulty servo pattern 25 has been detected, at operation S21. In particular, the control circuit 10 moves the magnetic-recording head 4 radially toward the outer circumference by the distance $\Delta$wr between the write element 41 and the read element 43 and checks whether data may be read from each track $n+1_A$ to $n+1_D$ by the read element 43. At this time, the control circuit 10 stores the absolute position of the detected faulty servo pattern 25 on the recording surface of the magnetic-recording disk 2 in an information storage means, such as a memory. In particular, the control circuit 10 stores cylinder data representing the radial position of the detected faulty servo pattern 25 and sector data representing a circumferential position of the detected faulty servo pattern 25. The radial and circumferential positions of the detected faulty servo pattern 25 may be determined relatively from cylinder data and sector data which are read from surrounding product address patterns 231 of the detected faulty servo pattern 25.

Figure 4C:
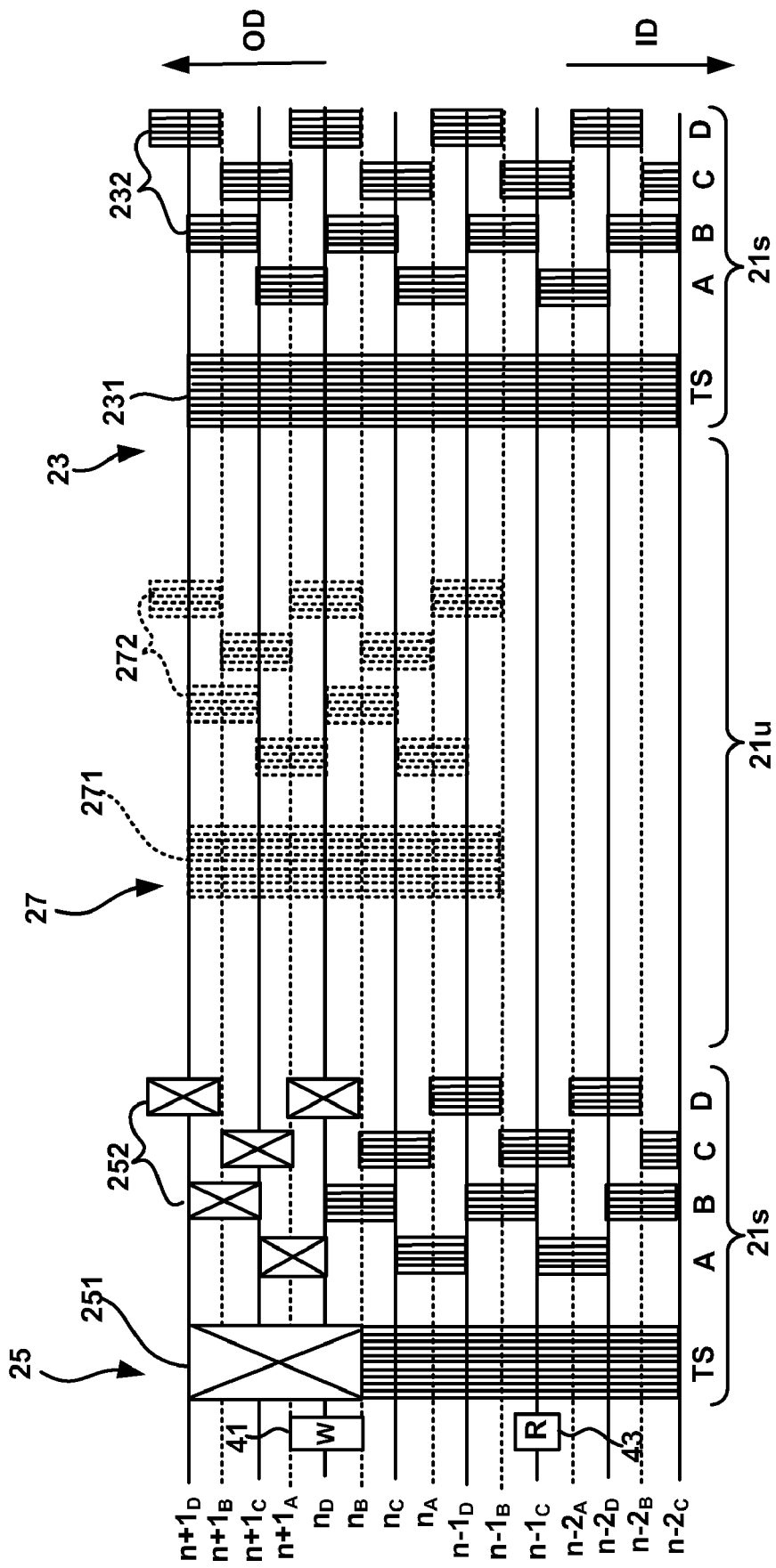
FIG. 4C is an explanatory diagram for operations S22 through S25 of the flowchart of FIG. 2, according to an embodiment of the present invention.

With reference now to FIG. 4C, in accordance with an embodiment of the present invention, then, the control circuit 10 moves the magnetic-recording head 4 radially toward the inner circumference, at operation S22, positions the magnetic-recording head 4, at operation S23, to position the write element 41 on each track $n_D$ to $n+1_D$ where the faulty servo pattern 25 was formed, and then forms a reserve servo pattern 27 in a user data region 21u, at operation S24. In particular, the control circuit 10 positions the write element 41 on one of the tracks, of which track $n_D$ is an example, where the faulty servo pattern 25 was formed and positions the magnetic-recording head 4, based on the burst signal read from a product burst pattern 232 on a track, of which track $n-1_C$ is an example, on which the read element 43 is positioned, in this state. Then, the control circuit 10 causes the write element 41 to form the reserve servo pattern 27 in synchronization of the timing of the approach of the user data region 21u under the magnetic-recording head 4, based on the servo mark which is read from the product address pattern 231 on the track on which the read element 43 is positioned. Thus, in an embodiment of the present invention, the reserve servo pattern 27 is a servo pattern that is formed in a user data region 21u and is formed so as to be distinguishable from product servo patterns 23. In particular, a servo mark formed in a reserve address pattern 271 within the reserve servo pattern 27 is represented differently from a servo mark formed in a product address pattern 231. Thus, in an embodiment of the present invention, when the read element 43 reads data from the reserve servo pattern 27 in a later process, the control circuit 10 may be signaled that the data that has been read from the reserve servo pattern 27 by the servo mark included in the data. Data other than the servo mark in the reserve servo pattern 27 is represented similarly to product servo patterns 23. In addition, reserve burst patterns 272 are formed corresponding to a set of the four types that are further designated A, B, C and D, for example, 232A, 232B, 232C and 232D, respectively, of product burst patterns 232 including a faulty burst patterns 252. That is, if any pattern in the set of the four types 232A, 232B, 232C and 232D, respectively, of product burst patterns 232 is a faulty burst pattern 252, the set may be regarded as faulty and therefore four types that are further designated A, B, C and D, for example, 272A, 272B, 272C and 272D, respectively, of reserve burst patterns 272 corresponding to the set are formed. For example, if one of the product burst patterns 232 respectively formed on tracks $n_A$ to $n_D$, for example, the pattern formed on the track $n_D$ is a faulty burst pattern 252, reserve burst patterns 272 are also formed on the tracks $n_A$ to $n_C$, respectively, not just on the track $n_D$, alone.

With further reference to FIG. 4C, in accordance with an embodiment of the present invention, on tracks disposed between the tracks on which faulty burst patterns 252 were formed and an inside diameter of the magnetic-recording disk 2, the same types of reserve burst patterns 272 as these faulty burst patterns 252 are formed. For example, if faulty burst patterns 252 are formed on tracks $n_D$ to $n+1_B$, corresponding types of reserve burst patterns 272 are formed on inner tracks $n-1_D$ to $n_B$. Thus, in an embodiment of the present invention, even if the read element 43 is likely to be positioned closer to the inside diameter of the magnetic-recording disk 2 than the tracks where a faulty servo pattern 25 was formed, positioning of the magnetic-recording head 4 may be performed, using the reserve burst patterns 272 formed on tracks closer to the inside diameter of the magnetic-recording disk 2 than the tracks where a faulty servo pattern 25 was formed. By repeating these operations S22 through S24, the control circuit 10 forms a reserve servo pattern 27 corresponding to each faulty servo pattern 25 in a user data region 21u, at operation S25.

Figure 4D:
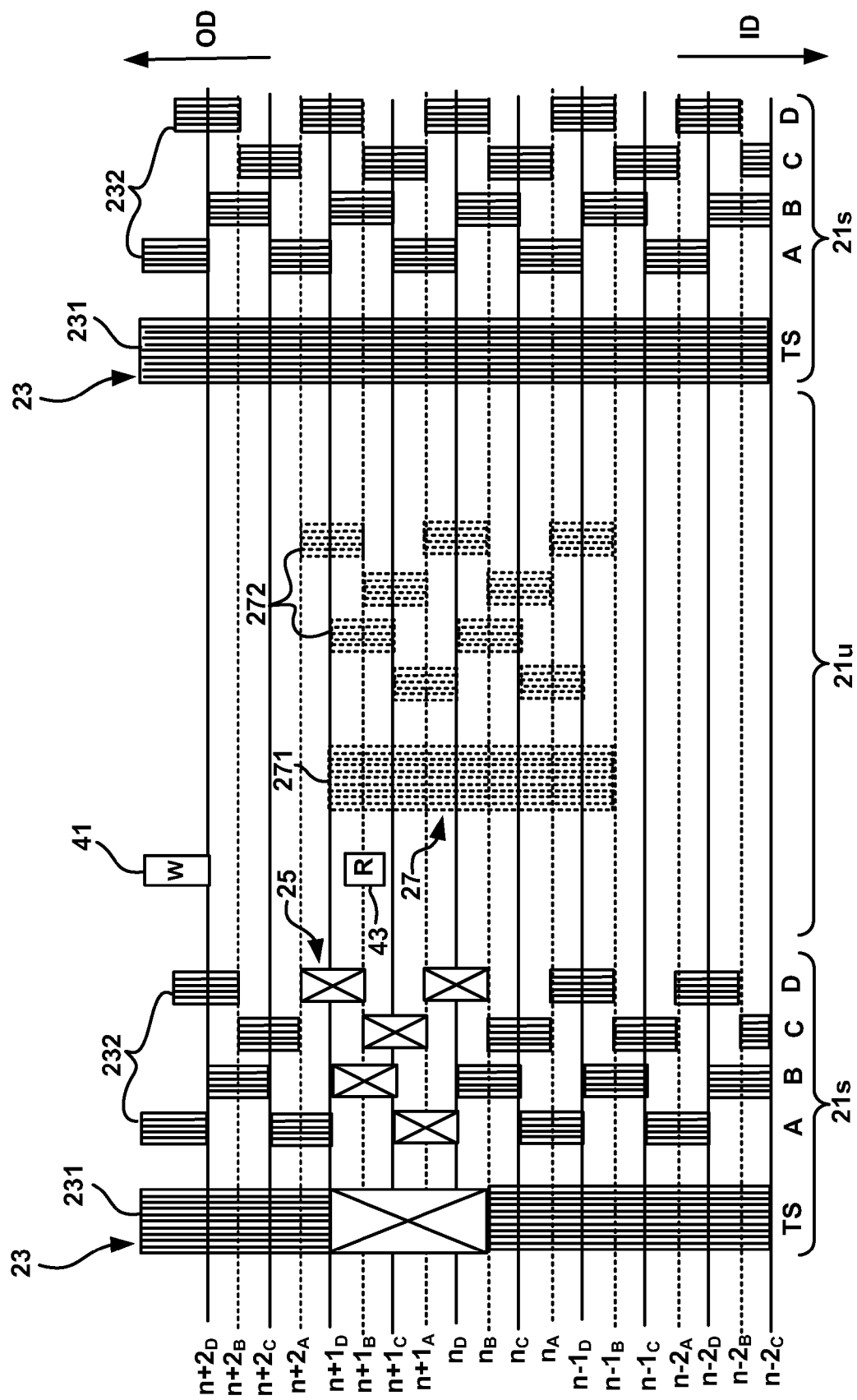
FIG. 4D is an explanatory diagram for operations S26 through S29 of the flowchart of FIG. 2, according to an embodiment of the present invention.

With reference now to FIG. 4D, in accordance with an embodiment of the present invention, subsequently, the control circuit 10 moves the magnetic-recording head 4 radially toward the outer circumference, at operation S26, positions the read element 43 on each of the tracks $n_D$ to $n+1_D$ where a faulty servo pattern 25 was formed and positions the magnetic-recording head 4, based on data read from a reserve servo pattern 27, at operation S27, and causes the write element 41 to form a new product servo pattern 23 in an outer portion of the servo data region 21s that is nearer to the outer circumference than the faulty servo pattern 25, at operation S28. In particular, the control circuit 10 positions read element 43 on one of the tracks, of which track $n+1_B$ is an example, where the faulty servo pattern 25 was formed, changes the sampling period by which data is extracted from the read-back signal, acquires a burst signal read from a reserve burst pattern 272, and positions the magnetic-recording head 4 based on the burst signal. Then, the control circuit 10 causes the write element 41 to form a product servo pattern 23 in a servo data region 21s in synchronization with the timing of the approach of the servo data region 21s under the magnetic-recording head 4, based on the servo mark read from the reserve burst pattern 272. By repeating these operations S26 through S28, the control circuit 10 causes the write element 41 to form a new product servo pattern 23 in an outer portion of the servo data region 21s that is nearer to the outer circumference, or OD, of the magnetic-recording disk 2 than the faulty servo pattern 25, at operation S29, using a reserve servo pattern 27.

Figure 4E:
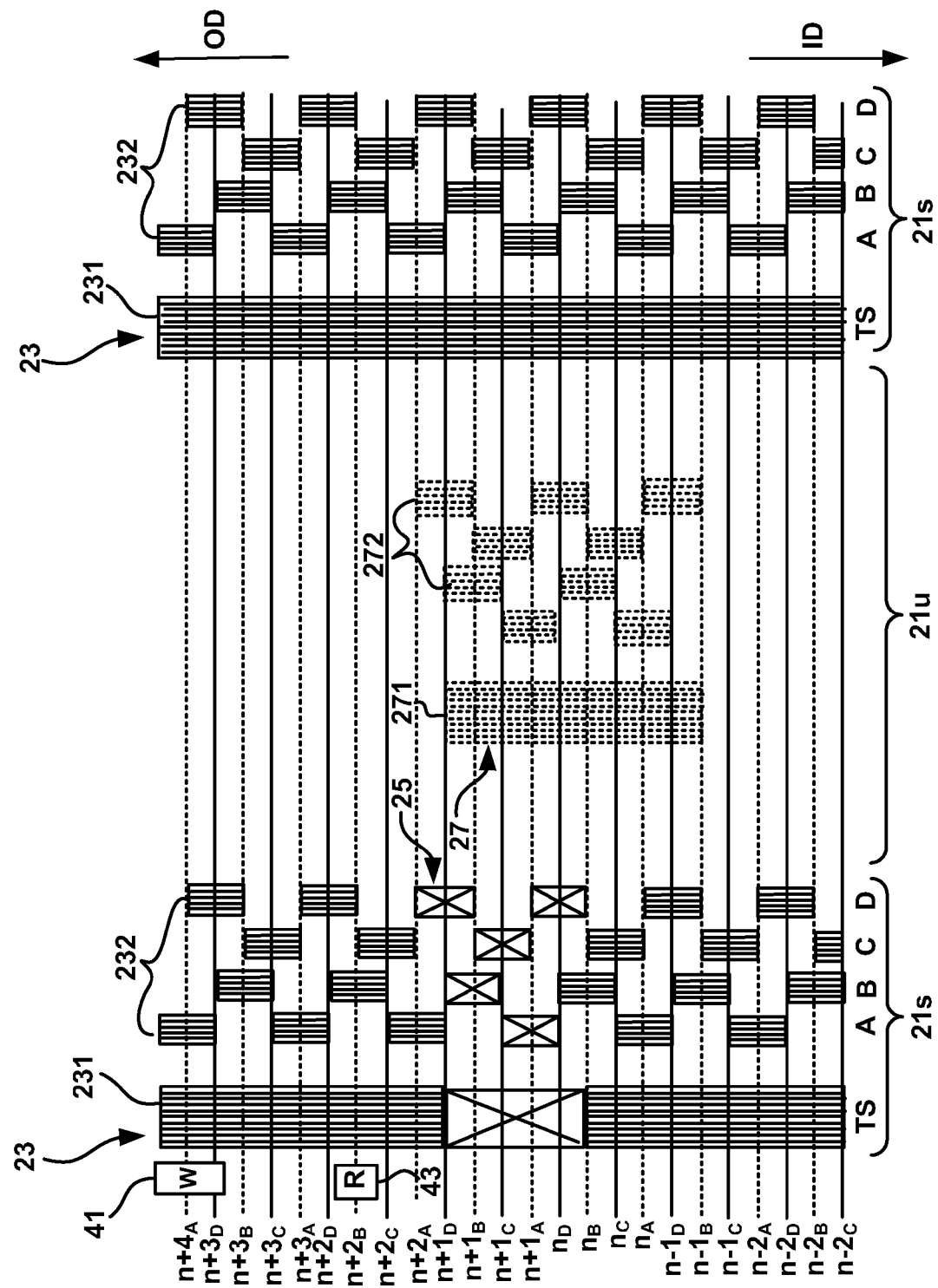
FIG. 4E is an explanatory diagram for operation S29 and operations following S29 of the flowchart of FIG. 2, according to an embodiment of the present invention.

With reference now to FIG. 4E, in accordance with an embodiment of the present invention, subsequently, the control circuit 10 returns to ordinary operations S11 through S15. In other words, the control circuit 10 moves the magnetic-recording head 4 radially toward the outer circumference, at operation S11, positions the magnetic-recording head 4, at operation S12, to position the read element 43 at one of the tracks, of which track $n+2_C$ is an example, where the new product servo pattern 23 was formed, and then causes the write element 41 to form a product servo pattern 23 in a servo data region 21s, at operation S14. After forming all product servo patterns 23 has been completed, an inspection is performed to confirm that data may be read from each product servo pattern 23. In one embodiment of the present invention, the radial and circumferential positions of a detected faulty servo pattern 25 are stored in the information storage means, as described above. Accordingly, the location where the faulty servo pattern 25 was formed may be excluded from the inspection. The location where the faulty servo pattern 25 was formed may be identified to the disk drive 1 as a location not to be used for reading and writing data. Reserve servo patterns 27 are also formed on a portion of tracks closer to the inside diameter of the magnetic-recording disk 2 than the tracks where a faulty servo pattern 25 was formed, as described above. These reserve servo patterns 27 formed on this portion of tracks may be erased and the portion may be used as a region for reading data from and writing data to the disk drive 1.

Figure 5:
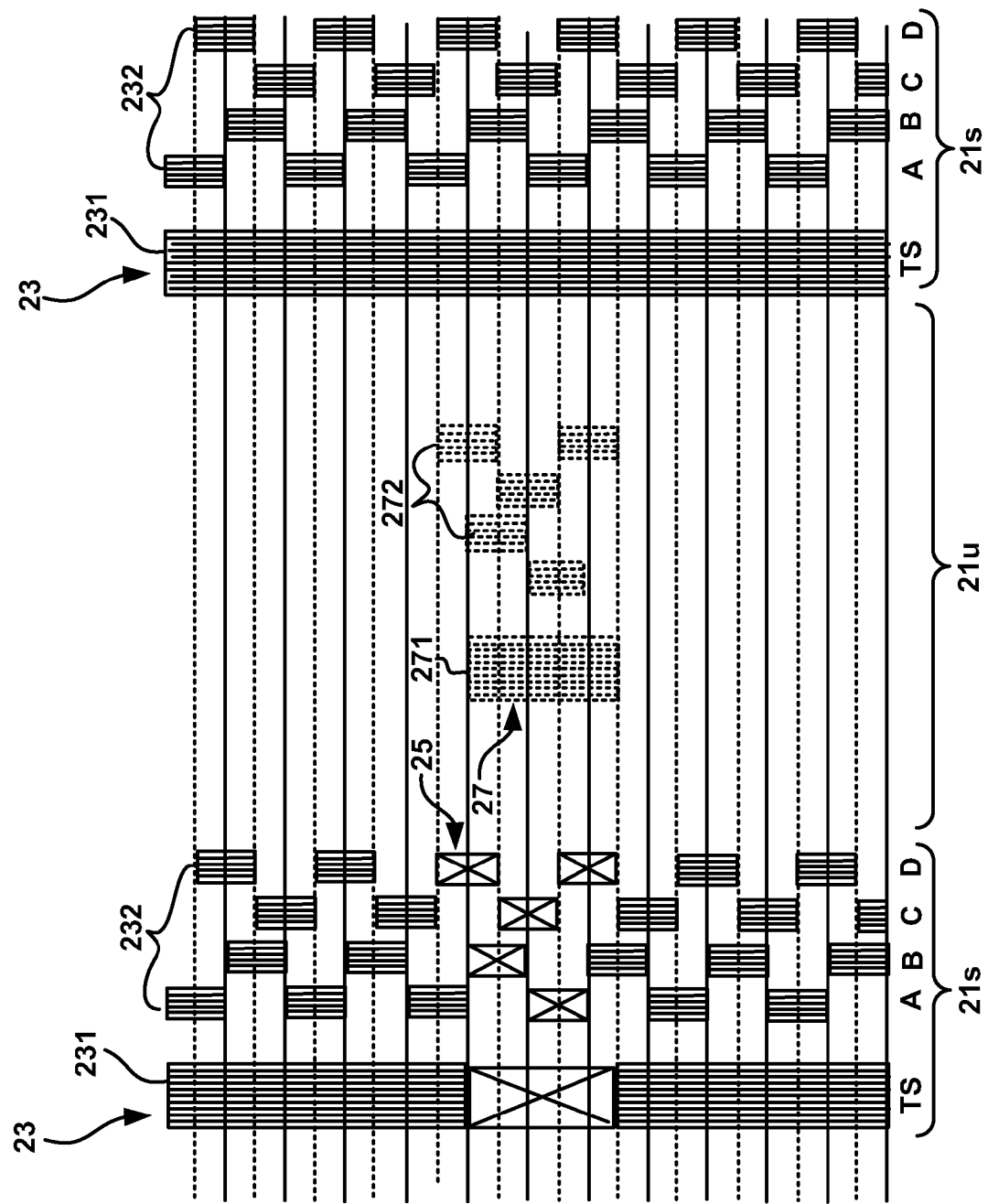
FIG. 5 is an explanatory diagram of a magnetic-recording disk with servo patterns formed by the method for forming servo patterns of the flowchart of FIG. 2, according to an embodiment of the present invention.

With reference now to FIG. 5, in accordance with an embodiment of the present invention, an enlarged view of a magnetic-recording disk 2 is shown that is produced in accordance with embodiments of the present invention. As shown in FIG. 5, reserve servo patterns 27 formed in a user data region 21u in the tracks where a faulty servo pattern 25 was formed remain, but reserve servo patterns 27 formed at other tracks are erased.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for forming servo patterns on a magnetic-recording disk, said method comprising:
    moving a magnetic-recording head in an opposite direction to a pattern development direction, when there is a faulty servo pattern from which data cannot be read by a read element of said magnetic-recording head;
    positioning a write element of said magnetic recording head on a track where said faulty servo pattern was formed and forming a reserve servo pattern at a different circumferential location from a circumferential location of said faulty servo pattern;
    moving said magnetic-recording head in said pattern development direction;
    positioning said read element on said track where said faulty servo pattern was formed and forming a new servo pattern in said pattern development direction by said write element at said circumferential location of said faulty servo pattern on a track disposed between said track where said faulty servo pattern was formed and an outside diameter of said magnetic-recording disk, based on data read from said reserve servo pattern by said read element;
    moving said magnetic-recording head in said pattern development direction, when said faulty servo pattern exists, and checking in said pattern development direction whether there is another faulty servo pattern on tracks disposed between said track where said faulty servo pattern was formed and an outside diameter of said magnetic-recording disk; and then moving said magnetic-recording head in said opposite direction to said pattern development direction.

2. The method recited in claim 1, said method further comprising:

when there is a faulty burst pattern of a plurality of burst patterns of said faulty servo pattern from which data cannot be read by said magnetic-recording head, forming at said different circumferential location a plurality of reserve burst patterns corresponding to said plurality of burst patterns of said faulty servo pattern.

3. The method recited in claim 1, wherein said reserve servo pattern is formed so as to be distinguishable from at least one other servo pattern.

4. An apparatus for forming servo patterns on a magnetic-recording disk, said apparatus comprising:

a control circuit, said control circuit configured to control timing to form a servo pattern and configured to control a position of a magnetic-recording head when forming said servo pattern; and wherein said control circuit is configured:

to move said magnetic-recording head in an opposite direction to a pattern development direction, when there is a faulty servo pattern from which data cannot be read by said read element;

to position a write element on a track where said faulty servo pattern was formed and to form a reserve servo pattern at a different circumferential location from a circumferential location of said faulty servo pattern;

to move said magnetic-recording head in said pattern development direction;

to position said read element on said track where said faulty servo pattern was formed and to form a new servo pattern in said pattern development direction by said write element at said circumferential location of said faulty servo pattern on a track disposed between said track where said faulty servo pattern was formed and an outside diameter of said magnetic-recording disk, based on data read from said reserve servo pattern by said read element;

to move said magnetic-recording head in said pattern development direction, when said faulty servo pattern exists, and to check in said pattern development direction whether there is another faulty servo pattern on tracks disposed between said track where said faulty servo pattern was formed and an outside diameter of said magnetic-recording disk; and then to move said magnetic-recording head in said opposite direction to said pattern development direction.

5. A method for forming servo patterns on a magnetic-recording disk, said method comprising:

moving a magnetic-recording head in an opposite direction to a pattern development direction, when there is a faulty servo pattern from which data cannot be read by a read element of said magnetic-recording head;

positioning a write element of said magnetic recording head on a track where said faulty servo pattern was formed and forming a reserve servo pattern at a different circumferential location from a circumferential location of said faulty servo pattern;

moving said magnetic-recording head in said pattern development direction;

positioning said read element on said track where said faulty servo pattern was formed and forming a new servo pattern in said pattern development direction by said write element at said circumferential location of said faulty servo pattern on a track disposed between said track where said faulty servo pattern was formed and an outside diameter of said magnetic-recording disk, based on data read from said reserve servo pattern by said read element; and storing a radial and circumferential position on said magnetic-recording disk where said faulty servo pattern exists.

6. The method recited in claim 5, said method further comprising:

inspecting servo patterns, wherein said inspecting skips said radial and circumferential position on said magnetic-recording disk where said faulty servo pattern exists.

7. The method recited in claim 5, further comprising:

identifying said radial and circumferential position on said magnetic-recording disk where said faulty servo pattern exists as a location not to be used for writing and reading data.

* * * * *